(12) United States Patent
Rahm

(10) Patent No.: US 8,433,368 B2
(45) Date of Patent: Apr. 30, 2013

(54) ACTIVE LINK CABLE MESH

(75) Inventor: James K. Rahm, Allentown, PA (US)

(73) Assignee: General Instrument Corporation, Horsham, PA (US)

( * ) Notice: Subject to any disclaimer, the term of this patent is extended or adjusted under 35 U.S.C. 154(b) by 638 days.

(21) Appl. No.: 11/613,295

(22) Filed: Dec. 20, 2006

(65) Prior Publication Data

US 2008/0151745 A1 Jun. 26, 2008

(51) Int. Cl.
*H04M 1/00* (2006.01)

(52) U.S. Cl.
USPC .............. 455/562.1; 455/575.7; 455/13.3; 455/25; 455/63.4; 343/751

(58) Field of Classification Search ........... 370/221, 370/310; 455/562.1, 13.3, 25, 63.475; 343/751, 343/757
See application file for complete search history.

(56) References Cited

U.S. PATENT DOCUMENTS

| | | | |
|---|---|---|---|
| 5,646,942 A * | 7/1997 | Oliver et al. ............... | 370/312 |
| 5,805,067 A * | 9/1998 | Bradley et al. .............. | 340/635 |
| 5,835,723 A * | 11/1998 | Andrews et al. ............. | 709/226 |
| 6,052,582 A * | 4/2000 | Blasing et al. ............. | 455/562.1 |
| 7,193,562 B2 | 3/2007 | Shtrom et al. | |
| 7,292,198 B2 | 11/2007 | Shtrom et al. | |
| 7,358,912 B1 | 4/2008 | Kish et al. | |
| 7,362,280 B2 | 4/2008 | Shtrom et al. | |
| 7,498,996 B2 | 3/2009 | Shtrom et al. | |
| 7,498,999 B2 | 3/2009 | Shtrom | |
| 7,583,641 B2 * | 9/2009 | Lord .............. | 370/337 |
| 7,652,632 B2 | 1/2010 | Shtrom | |
| 2002/0168946 A1* | 11/2002 | Aizawa et al. ............ | 455/82 |
| 2004/0242274 A1* | 12/2004 | Corbett et al. ............ | 455/562.1 |
| 2005/0088338 A1* | 4/2005 | Masenten et al. ........... | 342/368 |
| 2005/0164664 A1* | 7/2005 | DiFonzo et al. ........... | 455/277.1 |
| 2005/0200531 A1* | 9/2005 | Huang et al. .............. | 343/7 MS |
| 2006/0068822 A1* | 3/2006 | Kalhan .............. | 455/517 |
| 2007/0066299 A1* | 3/2007 | Roy et al. .............. | 455/423 |
| 2007/0242602 A1* | 10/2007 | Pang et al. .............. | 370/216 |
| 2007/0297366 A1* | 12/2007 | Osann .............. | 370/331 |
| 2008/0076353 A1* | 3/2008 | Rofougaran .............. | 455/41.2 |

* cited by examiner

*Primary Examiner* — Kamran Afshar
*Assistant Examiner* — Khalid Shaheed
(74) *Attorney, Agent, or Firm* — Lori Anne D. Swanson

(57) ABSTRACT

An active link wireless cable mesh network and a method for transmitting data in a wireless cable mesh network are provided. A plurality of end devices are connected in a mesh configuration. A data message is transmitted to a first end device via one of a plurality of antennas radiating elements which form a phased array antenna. If the message is not successfully received, the antenna radiating elements is steered to another transceiver in the mesh network to complete the transmission.

13 Claims, 4 Drawing Sheets

FIG. 1 *Prior Art*

ACTIVE LINK CABLE MESH

FIELD OF THE INVENTION

This disclosure relates generally to cable mesh networks, and more particularly to the use of a phased array antenna in a cable mesh network.

BACKGROUND OF THE INVENTION

Data-over-cable communication systems are frequently used to connect personal computers to the Internet and other networks. Data-over-cable communication systems allow high speed data distribution over cable television networks. However, the cost associated with installing the equipment necessary to provide data-over-cable access in a widespread manner can be quite high.

Currently, wireless connections have been used to provide cable access to areas not previously reached with hard wired data-over-cable access equipment. By utilizing wireless networks to provide cable access to new customers, it is possible to eliminate the high cost associated with providing hard-wire connections to the new customers. As one example, wireless mesh networks are utilized, which comprise wireless antennas placed at cable access points. The cable access point comprises components which allow customers to access (i.e., the reception and transmission of data) the cable system via a wireless connection. The wireless antennas disposed at the cable access points transmit and receive data to and from a particular area, referred to as a segment. Typically, omni-directional antennas are used at the cable access points. As is known, omni-directional antennas transmit and receive signals to and from all directions.

However, while omni-directional antennas are inexpensive and widely used, they have many drawbacks. For example, as a result of their broad transmission patterns, omni-directional antennas are susceptible to intentional jamming and interference. As such, there is a need for a wireless cable mesh network having components that are able to eliminate the problems associated with utilizing omni-directional antennas in cable access points in wireless cable-over-data systems, such as, reduce the effects of jamming and interference.

SUMMARY OF THE INVENTION

Accordingly, the present invention relates to a wireless cable-over-data system and method for implementing such a system, which overcomes the foregoing problems. More specifically, the present invention provides a cable access point having a programmable antenna, which allows for active control of the direction of transmission and reception of signals by the antennas. In other words, the present invention allows for active control of the antenna pattern associated with a given antenna at a given cable access point. As a result of the present invention, it is possible, for example, to electronically steer the reception pattern of the antenna so as to avoid a signal being transmitted as an interferer or jammer in a wireless mesh network.

In accordance with one embodiment of the present invention, a wireless cable network comprises a plurality of transceivers located at a cable access point and configured to transmit and receive data over a cable network to and from a plurality of transceivers located at an end user device. At least two of the plurality of transceivers located at the end user device are communicatively coupled to each other in a mesh configuration, wherein, at least one of the plurality of transceivers located at the cable access point is equipped with an electronically steerable phased array antenna capable of transmitting a steerable bean, and for controlling the received signal pattern associated with the antenna. The mesh configuration enables a signal to be routed between the plurality of end user devices.

The phased array antenna includes a controller configured to perform beam steering and null steering. That is, the controller is configured to direct the radiating antenna elements forming the phased array antenna to direct their transmissions to particular destinations. If a link between an antenna element and its destination becomes blocked, the controller directs the radiating element to steer its signal to another receiver in the mesh in order to complete the transmission. Additionally, the controller may be configured to null out any jammers within the transmission area.

According to another embodiment, one or more end devices, such as a user's home, may be equipped with a phased array antenna. Because the end devices are connected in a mesh configuration, a device equipped with a phased array antenna can cause its antenna to transmit and receive data through another end device in the event of signal blockage.

DETAILED DESCRIPTION OF THE INVENTION

Figure 1:
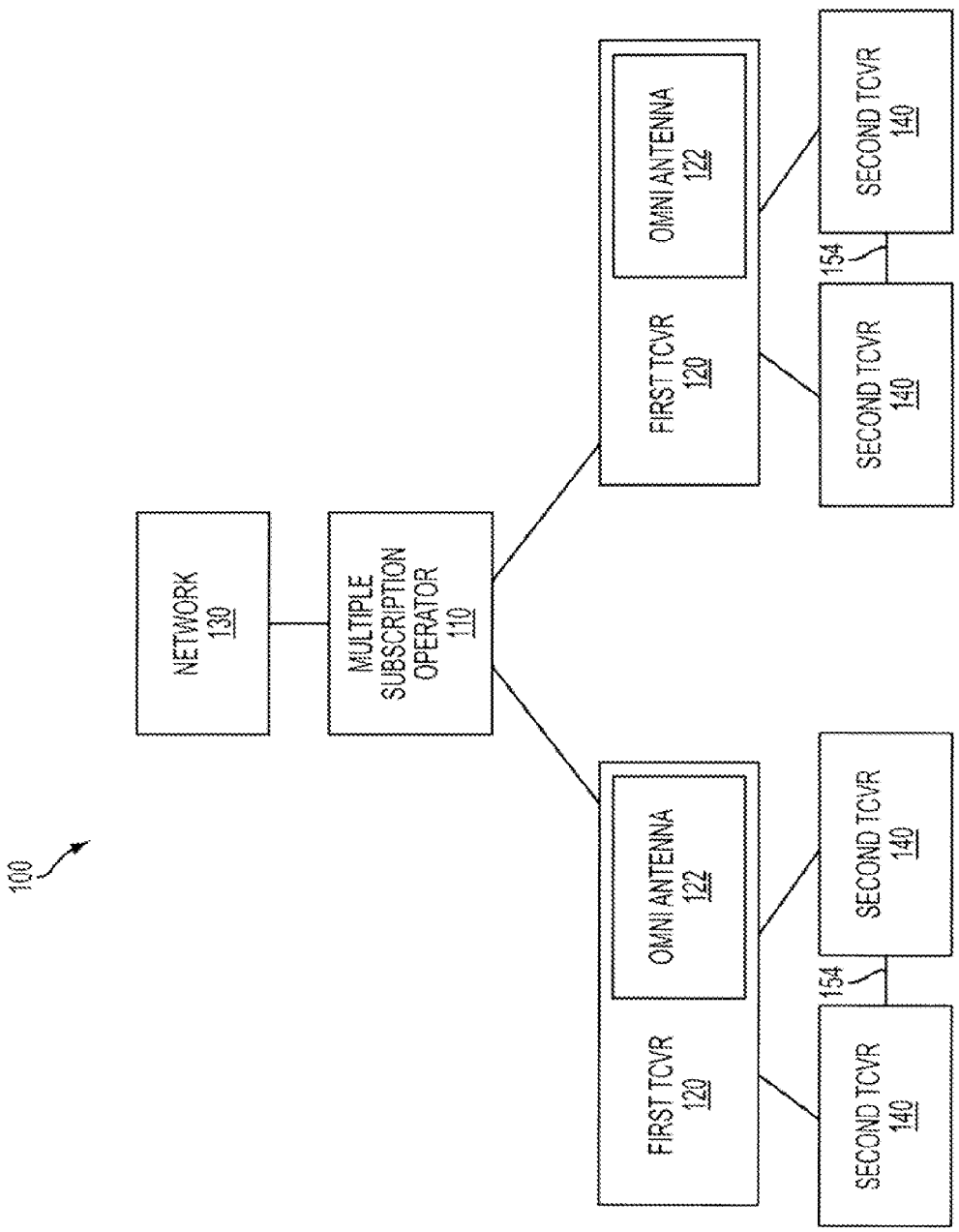
FIG. 1 depicts a conventional cable mesh network.

FIG. 1 depicts a conventional cable mesh network 100. Cable mesh network 100 comprises a multiple subscription operator (MSO) 110 connected to network 130. Network 100 further comprises a plurality of first transceivers 120 (each of which is capable of transmitting and receiving signals) located at a plurality of cable access points and communicatively coupled to MSO 110 and to a plurality of second transceivers 140 (each of which is capable of transmitting and receiving signals) associated with a plurality of end user devices. MSO 110 may be any cable service provider which enables the exchange of data between the end user devices and network 130. The mesh configuration enables each second transceiver 140 located at the end user device to interconnect with one or more other second transceivers 140 in addition to first transceivers 120. Signals may be routed through the mesh network from device to device until reaching the correct destination.

In accordance with traditional cable communications technology, each first transceiver 120 is equipped with an omni-directional antenna 122, configured to transmit and receive signals from all directions within a defined area. Specifically, omni-directional antenna 122 is configured to transmit and receive signals to and from second transceivers 140 located at each end user device. As depicted in FIG. 1, omni-directional antenna 122 transmits and receives signals through wireless communication links 142. Furthermore, in accordance with mesh technology, second transceivers 140 may be connected to each other through wireless links 154. Accordingly, each second transceiver 140 located at an end user device may communicate with other antennas at other end devices. Thus, in the event a link is unavailable, each device can still transmit and receive data to and from network 130. Additionally, one or more of the first transceivers 120 may be communicatively coupled to another of the transceivers via a wireless transmission link (not illustrated).

Figure 2:
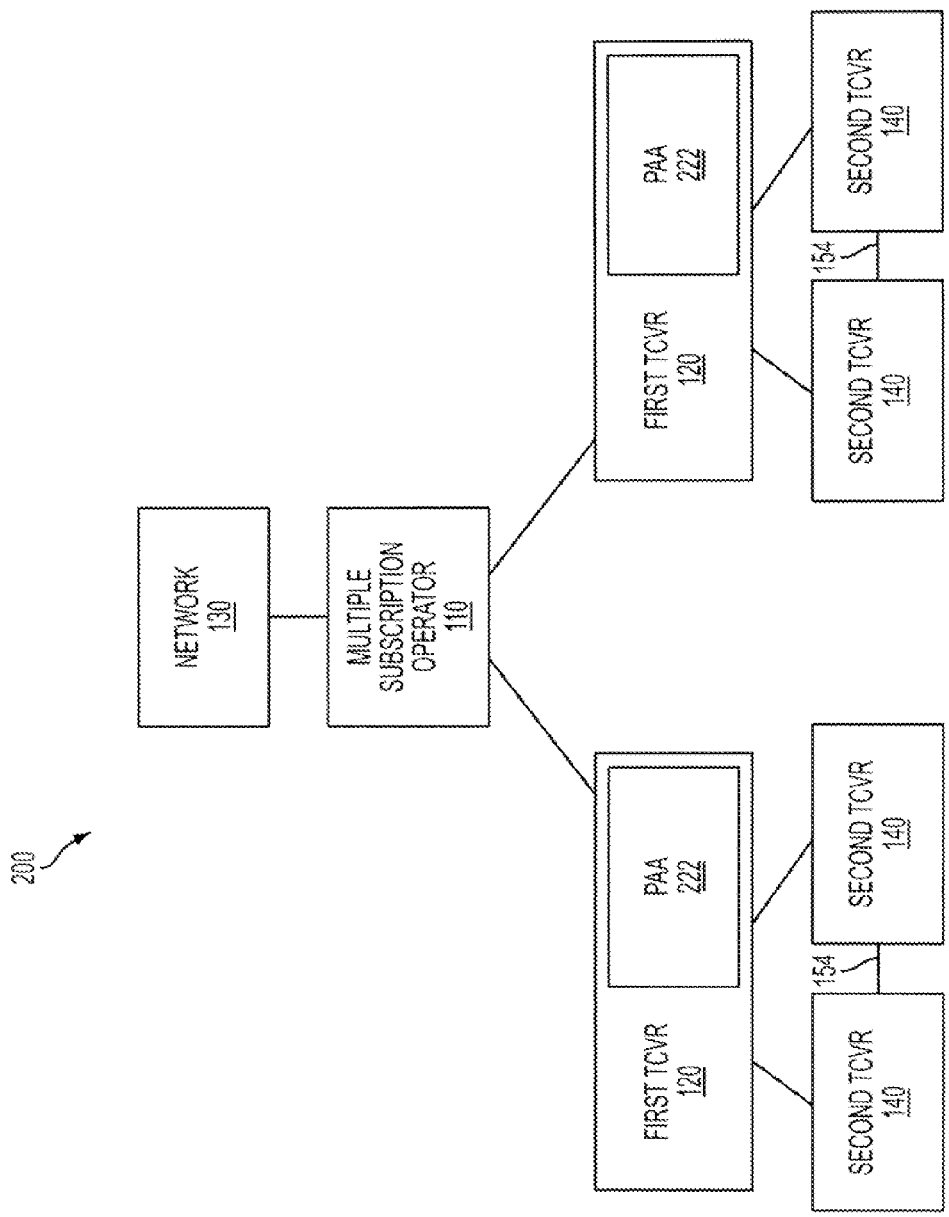
FIG. 2 depicts a cable mesh network incorporating a phased array antenna.

FIG. 2 depicts an exemplary cable mesh network 200, in accordance with one embodiment of the present invention. Cable mesh network 200 differs from network 100 in that omni-directional antenna 122 is replaced with a phased array antenna 222. Phased array antennas located at a cable access point may be configured to communicate with one or more of the plurality transceivers associated with each end user devices. Additionally, phased array antennas located at the cable access point may communicate with other access point transceivers in the network. The use of phased array antennas enhances communications within the network by providing electronically steerable beams. The phased array antenna may be configured by a controller to perform techniques such as, for example, beam steering, null steering, and switching (i.e. switching from one antenna or transceiver to another). These techniques enhance communication for example, by enabling the controller to actively steer around obstructions and interferers in the network.

There are many methods for phased array antenna control including, but not limited to, phase shifting radiating elements or groups of elements, attenuating or amplifying signals of individual radiating elements or groups of radiating elements, adjusting the frequency of signals (thereby adjusting the elements' spacing in terms of wavelength), and sliding mechanical devices. Phased array antennas can provide high gain directional antenna patterns that are desirable when in the presence of ground reflections and noise sources. Additionally, phased array antennas may be used to provide multiple beams and channels for simultaneous links to multiple locations. Phased array antennas, which have adjustable gain and pattern shape, may be used to suppress undesired signals from multiple locations (nulling). Additionally, phased array antennas may be electronically controlled and switched, enabling the antennas to operate in time division modes. According to one embodiment, the use of phased array antennas in a cable mesh network enables the network to allocate and parse links in defined time frames. The phased array antenna may provide terrestrial to terrestrial links, or any form of terrestrial to air/space links.

Figure 3:
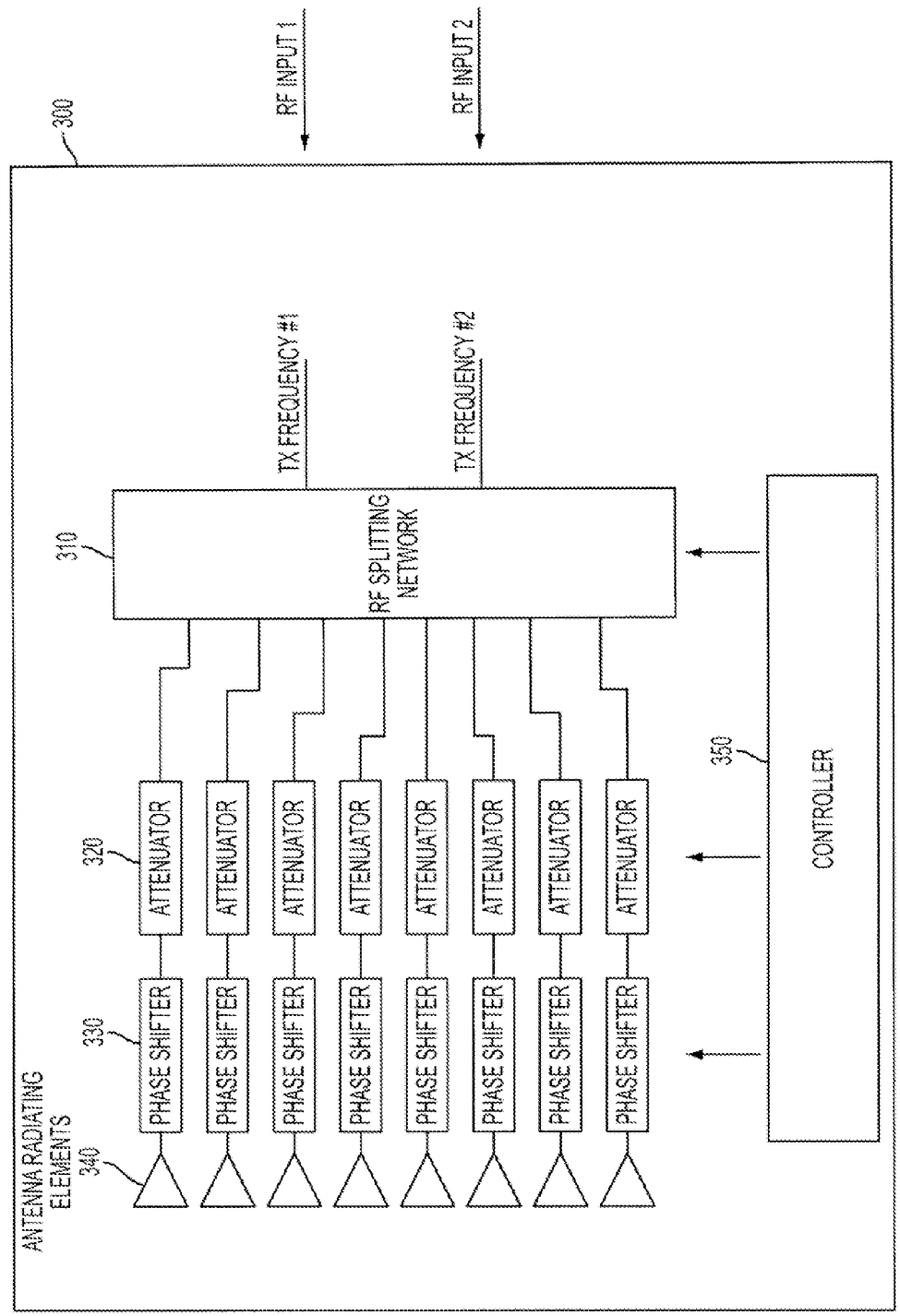
FIG. 3 depicts a phased array antenna incorporated into a transmitting location.

FIG. 3 depicts a phased array antenna 300, which may be installed at a cable access point, in accordance with one configuration. Phased array antenna 300 comprises a radio frequency (RF) splitting network 310, a plurality of attenuators 320, a plurality of phase shifters 330, and a plurality of antenna radiating elements 340, all of which are known components of a phased array antenna. Phase attenuators 320 and phase shifters 330 are configured to control the phase of the signal delivered to radiating elements 340. Phased array antenna 300 further comprises a controller 350 configured to electronically control the phasing and steering of beams radiating from and received by antenna radiating elements 340.

Controller 350 is configured to direct the signals from antenna radiating elements 340 to a particular destination. According to one embodiment, each antenna radiating element 340 may be configured to direct its signal towards a specific receiver. For example, an antenna radiating element may be configured to direct its signal to a specific end device or to another transmitting location.

Controller 350 may also be configured to discover broken links between a radiating element and its destination transceiver. For example, a link may be considered broken if it is blocked or otherwise unavailable. Controller 350 may determine that there is a problem with a link, for example, by determining whether any messages or responses to transmitted message are received within a predetermined time period. According to some embodiments, controller 350 may transmit a polling message over a link to test the operation of the link. Controller 350 may also be configured to perform beam steering and null steering. Controller 350 may be configured to declare that a link is broken if a transmission is not completed within a predetermined number of attempts, or if the power level of return signal is below a predefined power level. Controller 350 may then direct the antenna experiencing a broken link to steer its beam around the blockage. This may include, for example, directing the antenna to another transceiver within the mesh network to complete the transmission. As a result of the mesh configuration, the secondary transceiver is able to communicate with the intended destination.

Null steering may be used, according to one embodiment, to increase the performance of the mesh network when in the presence of undesired signal. Null steering enables the controller to direct radiating elements to steer signals from one or more radiating antennas around an undesired signal. An undesired signal may include, for example, malicious or non-malicious sources, such as jamming signals. A jamming may be any signal within the frequency band of the antenna radiating element. Thus, the controller may be configured to detect the presence of an undesired signal and steer around it.

Figure 4:
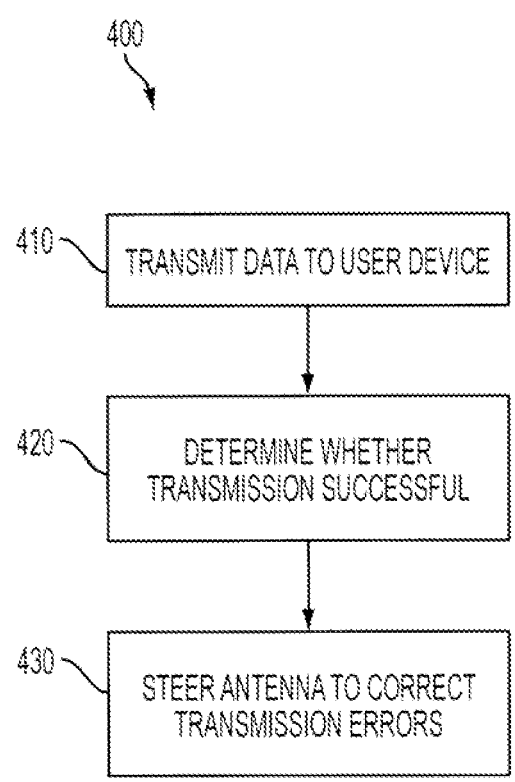
FIG. 4 depicts a method of transmitting data in a mesh network, in accordance with one embodiment of the invention.

FIG. 4 depicts a process 400 in accordance with one embodiment of the invention. As depicted at 410, a transceiver associated with a cable access point transmits data to a user device. The data may be data originating at an external network or from one or more other devices within the network. According to one embodiment, the transceiver located at the cable access point determines whether the data was successfully transmitted, as depicted at 420. This may include, for example, determining whether an acknowledgment has been received or whether an error message has been generated.

If the transmission is unsuccessful, the transceiver may steer its antenna beam to an alternate location to complete the transmission, as depicted at 430. For example, a controller associated with the transceiver may direct the transceiver to steer to a different angle, or to use a different beam to complete the transmission via a different receiver.

In accordance with the various aspects of the invention described above, wireless communication is greatly improved. The system provides multiple paths through the network, which improves communication in the event of path blockage, interference, or other obstructions.

The process described in connection with FIG. 4 may be implemented in hard wired devices, firmware, or software running in a processor. A processing unit for a software or firmware implementation is preferably contained in the first transceiver associated with a cable access point. This process may be contained on a computer readable medium which may be read by the first transceiver. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

Those of skill in the art will appreciate that a computer readable medium may carry instructions for a computer to perform a method of transmitting data in a wireless cable mesh network comprising at least the steps of: transmitting a data message to a first transceiver over a first communication link associated with a first one of a plurality of antennas which form a phased array antenna; and determining whether the data message is successfully received at the first transceiver, wherein if the data message is not successfully received, steering the first one of the plurality of antennas to a second transceiver, the second transceiver being communicatively coupled to the first receiver in a mesh configuration.

While various aspects have been described above wherein a phased array antenna is configured at a cable access point, one or more of the end devices may also be equipped with a phased array antenna operating in a similar manner. The end devices would then be able to rotate their respective antenna radiating elements around a broken link in order to receive data. For example, a controller associated with the receiving location may direct the phased array antenna to steer to a different angle, or use another pattern to receive signals from a different transmitting location while suppressing those transmissions from the normal viewing angle.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims.

What is claimed is:

1. A wireless cable network comprising:
a first transceiver associated with a cable access point and configured to transmit and receive data over a cable network and to a node of a wireless mesh network; and
a plurality of second transceivers, each second transceiver being associated with one of a like plurality of end user devices, wherein the plurality of second transceivers are communicatively coupled to each other in a wireless mesh network configuration, and wherein the plurality of second transceivers provide access to the cable network through the first transceiver for the transfer of information to and from the like plurality of end user devices;
wherein, the first transceiver and at least one of the second transceivers are each equipped with an electronically steerable phased array antenna and wherein the first transceiver and the at least one of the second transceivers are each capable of steering the beams of their electronically steerable phased array antenna to form a first link between the first transceiver and the one of the second transceivers when the first transceiver determines that a second link between the first transceiver and another one of the second transceivers is unavailable, wherein determining that the second link is unavailable comprises determining that no acknowledgement message has been received in response to a message sent to the other one of the second transceivers.

2. The network of claim 1, wherein the electronically steerable phased array antenna comprises:
a controller configured to steer the steered beams to a selected plurality of the second transceivers.

3. The network of claim 1, wherein the first transceiver is configured to direct the steered beams around an interferer.

4. The network of claim 1, wherein each of the steered beam(s) is steered to one of the second transceivers forming the link.

5. The network of claim 2, wherein the controller is configured to determine whether a communication link between the first transceiver and one of the plurality of second transceivers is unavailable.

6. A method of transmitting data, the method used in transceivers of a wireless mesh network, comprising:
transmitting a data message from a first transceiver to a second transceiver of the wireless mesh network over a first communication link using a steered beam formed by a phased array antenna of the first transceiver and a steered beam formed by a phased array antenna of the second transceiver, wherein the message has a destination of a cable network access point external to the wireless mesh network that also has a phased array antenna; and
determining that the first communication link is unavailable when no acknowledgment is received for the data message,
wherein when the determination is that the first communication link is unavailable, steering the steered beam to a third transceiver of the wireless mesh network, wherein the third transceiver steers a beam formed by a phased array antenna of the third transceiver and retransmitting the data message when a link is established with the third transceiver.

7. The method of claim 6, wherein each of the phased array antennas is an electronically steerable phased array antenna comprising a controller configured to steer an antenna beam to a desired receive location.

8. The method of claim 6 further comprising:
determining whether there is an interferer blocking communications to the third transceiver; and
directing the steered beams of the second and third transceivers around the interferer.

9. A tangible computer readable medium carrying instructions for a computer to perform a method of transmitting and receiving data by a cable access point (CAP) transceiver over a cable network and to a node of a wireless mesh network, said method comprising the steps of:
transmitting a data message to a first transceiver that is within the wireless mesh network over a first communication link using a steered beam formed by a phased array antenna of the CAP transceiver that has a steered beam, wherein the message has a source of a cable network; and
determining that the first communication link is unavailable when no acknowledgment is received for the data message,
wherein when the determination is that the first communication link is unavailable, steering the steered beam to a second transceiver of the wireless mesh network and retransmitting the data message when a link is established with the second transceiver, wherein determining that the data message is not successfully received comprises determining that no acknowledgement message has been received.

10. The tangible computer readable medium according to claim 9, wherein the phased array antenna is an electronically steerable phased array antenna comprising a controller configured to steer an antenna beam to a desired receive location.

11. The tangible computer readable medium according to claim 9, wherein the method further comprises:
determining whether there is an interferer blocking communications to the second transceiver; and
directing the steered beam around the interferer.

12. The network of claim 2, wherein the controller is further configured to form a pattern to receive signals from the selected plurality of transceivers while suppressing transmissions from those of the plurality of transceivers that are not selected.

13. The tangible computer readable medium according to claim 9, wherein the method further comprises electronically steering a reception pattern of the phased array antenna of the CAP transceiver to provide a high gain pattern when in the presence of ground reflections and noise sources.

\* \* \* \* \*